Dec. 20, 1955
W. D. KELLY
2,728,070
LIQUID LEVEL TESTER
Filed Dec. 4, 1952
4 Sheets-Sheet 3
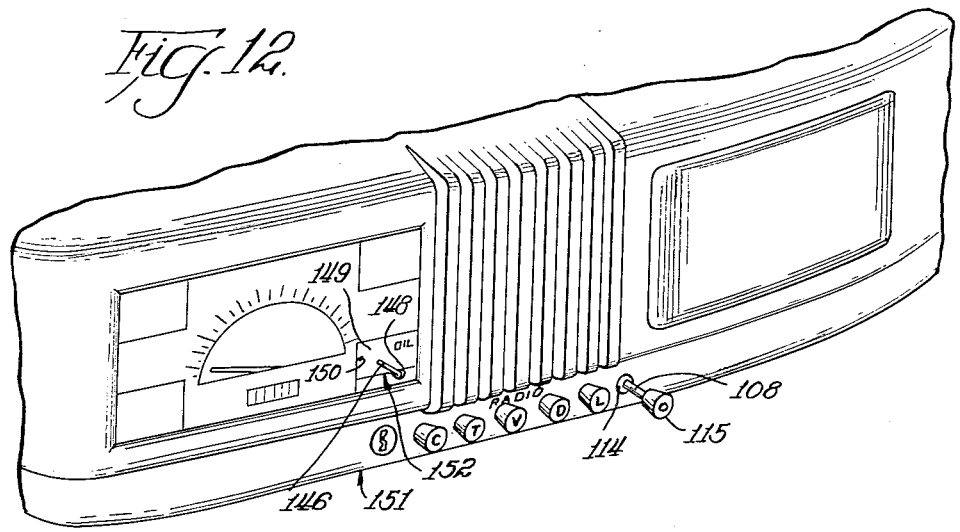
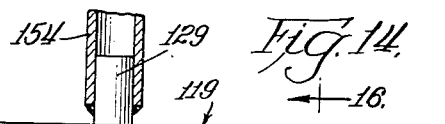
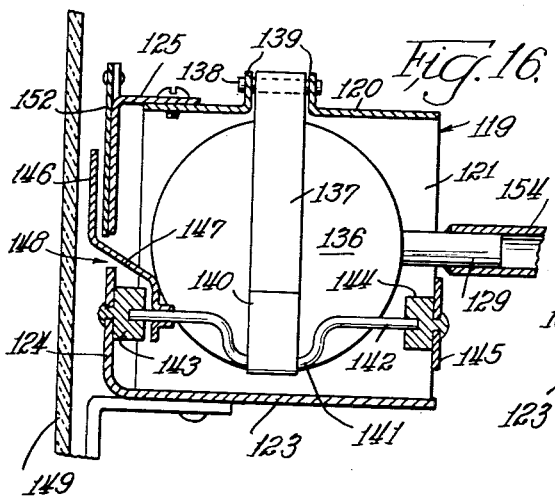
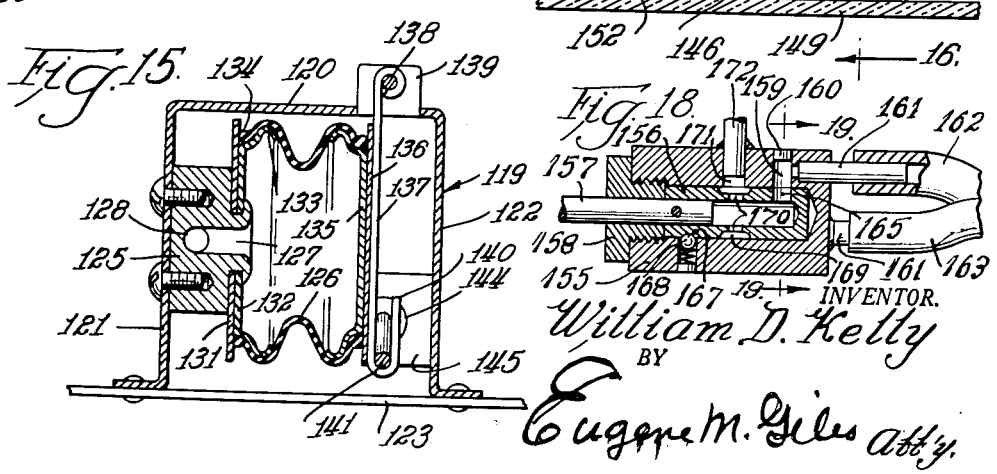
INVENTOR.
William D. Kelly
BY
Eugene M. Giles atty.

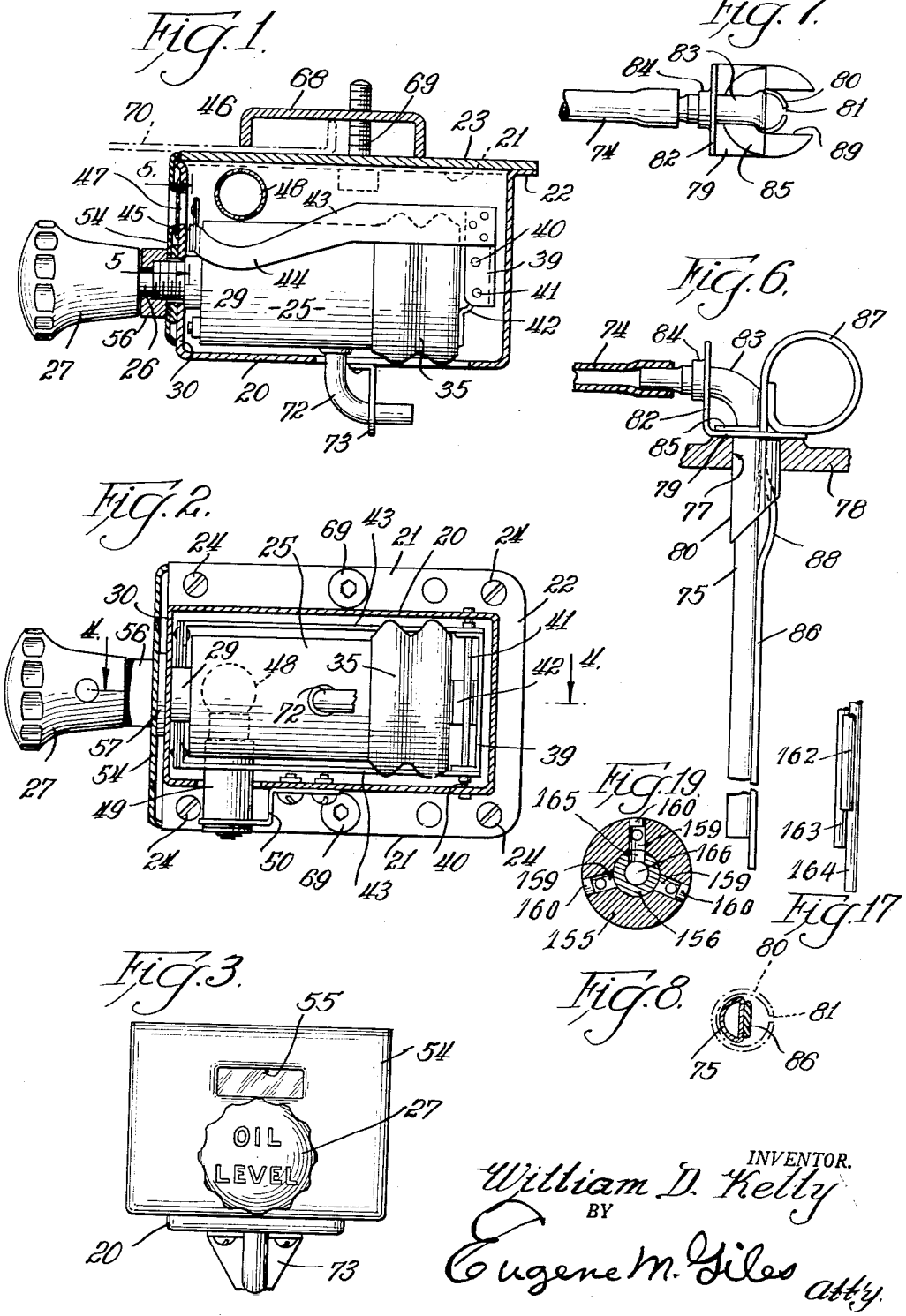

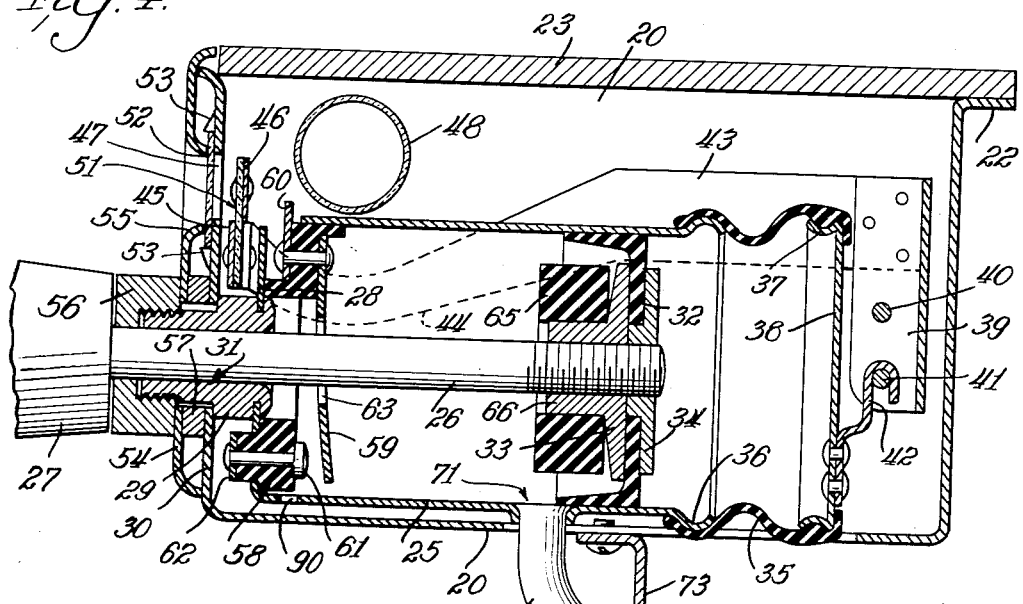

Dec. 20, 1955 W. D. KELLY 2,728,070
LIQUID LEVEL TESTER
Filed Dec. 4, 1952 4 Sheets-Sheet 4

INVENTOR.
William D. Kelly,
BY Schroeder, Merriam,
Hofgren & Brady
Atty's.

United States Patent Office 2,728,070
Patented Dec. 20, 1955

2,728,070

LIQUID LEVEL TESTER

William D. Kelly, Western Springs, Ill.

Application December 4, 1952, Serial No. 323,962

9 Claims. (Cl. 340—244)

My invention relates to a liquid level tester to actuate a signal which is indicative of the liquid level, the invention being particularly adaptable to motors of automobiles and the like for ascertainment from the operator's position whether the oil in the motor crankcase is sufficiently low to require replenishing.

This application is a continuation-in-part of my co-pending application Serial No. 66,627, filed December 22, 1948, now abandoned.

In internal combustion motors of four cycle type, such as commonly used in automobiles, it is customary to lubricate the motor from a supply of oil in the crankcase, and it is important to maintain a sufficient supply at all times to insure adequate lubrication.

Generally the motor crankcase is provided with a measuring stick removably mounted in an opening in the top of the crankcase to project downwardly therein to a point near the bottom, and this stick is provided with graduations so that by withdrawing the stick and noting the oil depth as shown by the graduations the adequacy of the oil supply is acertainable.

In many cases, however, such measuring facilities are not appropriate nor suitable to insure adequate attention to the motor oil supply. For example, in automobiles, such measuring sticks are not available for inspection while the automobile is in use, and that is the time when the operator is most likely to be conscious of any need to check the motor oil supply. Moreover, the checking of the crankcase oil with the measuring stick is inconvenient and likely to be a dirty and oily job, and consequently most automobile operators never check the oil themselves but rely on the filling station attendants to do so.

It is the principal object of my invention, therefore, to provide a liquid level tester which is particularly suitable for use on automobiles and the like and adapted to be located where the operator may ascertain at any time whether there is sufficient oil in the crankcase of the motor.

Other objects of the invention are to provide a liquid level tester which is simple, convenient, reliable, inexpensive and readily installed on an automobile to indicate at the instrument panel whether or not there is sufficient oil in the crankcase of the motor; to permit application of the tester in the same crankcase opening already provided for the customary measuring stick; and to permit a measuring stick to be employed in the same crankcase opening in which the tester of the present invention is installed, all these and other objects being accomplished, as pointed out more particularly hereinafter and as shown in the accompanying drawings, in which:

Fig. 1 is a side view, partly in section, of the signal and signal operating facilities of my invention combined in a unit suitable for application as an attachment on the instrument panel of an automobile;

Fig. 2 is a bottom view of the unit of Fig. 1 with the bottom wall of the enclosing case broken away;

Fig. 3 is a front view of the unit of Fig. 1;

Fig. 4 is an enlarged vertical longitudinal sectional view of said unit taken on the line 4—4 of Fig. 2;

Fig. 5 is a view, taken on the line 5—5 of Fig. 1, of the signal strips as they appear when illuminated;

Fig. 6 is a side view of the portion of the tester which is inserted in the crankcase of the automobile;

Fig. 7 is a top view of the structure shown in Fig. 6;

Fig. 8 is a view of the bottom end of the structure of Fig. 6;

Fig. 9 is a fragmentary longitudinal sectional view of the bellows end of the unit of Fig. 1 showing a modification of the signal mechanism;

Fig. 10 is a fragmentary bottom view of the structure shown in Fig. 9;

Fig. 11 is a wiring diagram of the modified signal mechanism of Figs. 9 and 10;

Fig. 12 is a perspective view of an automobile instrument panel wtih the signal and the signal operating facilities of my invention constructed as separate units and mounted separately thereon;

Fig. 13 is a longitudinal sectional view of the separate operating unit of my invention illustrated in Fig. 12;

Fig. 14 is a top view of the separate signal or indicator unit of Fig. 12;

Fig. 15 is a sectional view taken on the line 15—15 of Fig. 14;

Fig. 16 is a sectional view taken on the line 16—16 of Fig. 14;

Fig. 17 is a fragmentary side view of the lower end of a three tube crankcase fitting for testing the oil level at three different elevations;

Fig. 18 is a sectional view of a tube selector for selectively connecting the tubes of Fig. 17 with a single suction device of the character shown in Figs. 1 and 13;

Fig. 19 is a sectional view on the line 19—19 of Fig. 18;

Figure 20:
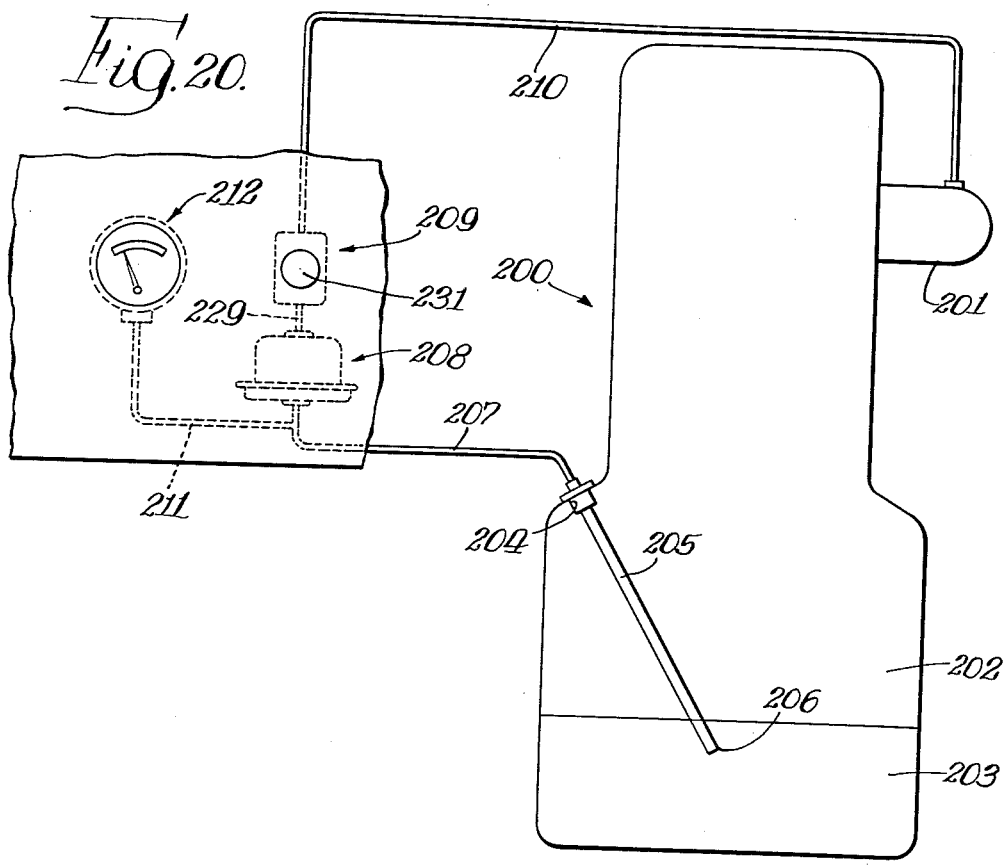
Fig. 20 is a schematic view of a modified form of apparatus showing an internal combustion engine, intake manifold and crankcase.

While this invention is susceptible of embodiments in many different forms, there are shown in the drawings and will herein be described in detail several specific embodiments, with the understanding that the present disclosure is to be considered as an exemplification of the principles of the invention and is not intended to limit the invention to the embodiments illustrated. The scope of the invention will be pointed out in the appended claims.

In general, the present invention comprises a signal or indicator, operated by a suction device which has a tube leading therefrom into the container or receptacle of the liquid to be tested and terminating therein at a selected low liquid level so that the operation of the signal or indicator by the suction device is directly controlled by the presence or absence of liquid at that low level.

In its application to automobiles or the like, for which the invention is particularly designed, the suction facilities and the signal or indicator may be combined in a single unit, as shown in Figs. 1, 2, 3 and 4, which is attachable to the instrument panel or elsewhere, as desired, or they may be made as separate units, as shown in Figs. 13, 14, 15 and 16, permanently mounted at separate places on the instrument panel, as indicated in Fig. 12.

Referring first to the combination unit construction of Figs. 1, 2, 3 and 4, the reference numeral 20 indicates the case for the unit, said case being provided at the top with side flanges 21 and a rear flange 22 onto which a cover plate 23 is secured by screws 24. This case 20 contains a small suction pump comprising a cylinder 25 containing a plunger secured on the rear end of a plunger stem 26 which projects through the front of the case 20 and has an operating knob 27 on the outer end.

The cylinder 25 has a front wall 28 provided with a fitting 29 by which the cylinder is secured endwise to the front wall 30 of the case 20 and the fitting 29 has a central opening 31 through which the plunger stem 26 projects.

The suction pump plunger, which is secured on the rear end of the stem 26 is of customary pump plunger construction and comprises a forwardly facing flexible cup member 32 which fits closely against the cylinder wall and is clamped between plates 33 and 34, both of which are threaded on the stem 26.

The rear end of the cylinder 25 is closed by a flexible tubular bellows extension 35 of annularly corrugated form to collapse in the direction of the length of the cylinder 25, and the forward end of this bellows is stretched tightly on an annular corrugation 36 on the rear end of the cylinder 25 whereas the rear end of the bellows 35 is stretched tightly on and fits in the annular seat 37 of the disk 38 which closes the rear end of the bellows 35. This bellows 35 normally tends to assume and maintain the extended position shown in Fig. 4 but upon pulling the plunger 32, 33, 34 forwardly, the latter creates air reduction or suction in the bellows 35 and collapses the bellows axially and pulls the end wall 38 thereof forwardly therewith.

A rocking frame 39 is pivoted at the rear of the bellows 35 on a pivot pin 40 which extends between the side walls of the case 20 and this frame 39 has a cross pin 41 below the pivot pin 40 and engaged by a hook 42 on the bellows end plate 38 so that when the latter is pulled forwardly by the suction of the plunger 32, 33, 34 a rocking action is imparted to the frame 39 on its pivot pin 40.

A pair of arms 43 extend forwardly from the upper end of the frame 39 at opposite sides of the cylinder 25, each being of inverted goose neck form at its forward end as shown at 44 for a reason hereinafter explained, and a pair of superposed translucent strips 45 and 46 are mounted on and extend between the forward ends of these arms 43 direcely behind the front wall 30 of the casing 20.

Because of the weight of the forwardly extending arms 43 and the attachments on the front end thereof, and also because the bellows 35 normally tends to assume an extended form, the strips 45 and 46 normally occupy the position shown in Fig. 4 wherein the lower strip 45 is directly above the fitting 29 and between the front wall 28 of the cylinder 25 and the front wall 30 of the case 20, in which position the upper strip 46 is located approximately above the top of the cylinder 25. The front wall of the case 20 is provided with a window opening 47 directly in front of said normal position of the strip 46 so that the latter is visible therethrough when the suction device, bellows 35 and the frame 29 with its arms 43 are all in the normal position, the arrangement being such, however, that when the plunger 32, 33, 34 is pulled forwardly and the bellows 35 thereby contracted, the frame 39 and its arms 43 are rocked sufficiently on the pivot pin 40 to lift the lower strip 45 upwardly to a position directly behind the window opening 47 at which time the upper strip 46 is in a concealed position above said opening 47.

Said strips 45 and 46 are differently marked or differently colored so that each is readily distinguishable from the other through the window opening 47 for indicating respectively different levels of liquid, the upper strip 46, which is normally directly behind the window opening 47 and in the operation of the device signifies low level, being preferably of a red translucent material and the strip 46 which in the operation of the device signifies normal or sufficiently high liquid level being preferably of a green translucent material.

For illuminating the particular strip 45 or 46 that is located directly behind the window opening 47, a small electric lamp 48 is mounted, directly behind the location of the strips 45 and 46, in a socket 49 which is secured to a bracket 50 on the exterior of the case 20 and extends through an opening in the side wall of the case 20, and said lamp is normally unlighted, as hereinafter explained, and energized only when the plunger 32, 33, 34 is pulled forwardly to the extreme forward position.

The inverted gooseneck form 44 of the arm 43 at the socket side of the case affords clearance so that the socket of the frame 39 49 does not interfere with the rocking of the frame 39 and arms 43 to elevate the lower strip 46 to a position directly behind the window openings 47. In said elevated position the top wall 23 serves as a stop to limit upward swinging of the frame 39 and arms 43 whereas the fitting 29 serves as the downwardly swinging stop.

In the normal position of the device the red strip 46, which is indicative of low liquid level, is normally directly behind the window opening 47, as hereinbefore explained, and it is preferable at such time that the red color be sufficiently obscured so that it will not appear to signify low liquid level.

Accordingly, the red strip 46 is preferably mounted behind a translucent white panel 51 which normally obscures the red color of the strip 46, and this panel 51 is preferably of such vertical width to extend downwardly behind the green strip 45 and is secured to the rocking frame arms 43 and serves as a mounting for the strips 45 and 46.

Thus, in the normal position of the device only the upper portion of the white panel 51 is visible through the window opening 47 and the white color thereof signifies no liquid level indication. When, however, the plunger 33, 34, 35 is pulled forwardly to test the liquid level and the electric lamp 48 is lighted, the red strip 46, if directly behind the window opening 47, is visible through the translucent white panel 51 and provides a red signal at the window opening. On the other hand, if the green strip 45 is directly behind the window opening 47, the green strip is illuminated through the panel 51 and provides a green signal at the window opening.

Preferably a transparent panel 52 is mounted in front of the window opening 47 within marginal abutments 53 punched out from the casing front wall 30 and the panel 52 is clamped against said front wall by a finishing plate 54 which has a bevel edged opening 55 corresponding to the window opening 47.

This finishing plate has the marginal edges beveled as shown in Fig. 4 and is secured in place by a nut 56 threaded on the outer end of the fitting 29, a washer 57 being preferably interposed between the plates 30 and 53 at the nut location.

For operating the electric lamp 48 a normally open switch is provided within the front end of the cylinder 25 and arranged to be engaged and closed by the plunger 32, 33, 34 when the latter is pulled forwardly to the extreme forward position, and the electric lamp 48 is in an electric circuit which is controlled by said switch. Thus, the lamp 48 is normally unlighted because of the normal open position of the switch, but is energized and lighted temporarily by the closing of the switch whenever the plunger is pulled forwardly to operate the liquid level testing device.

For mounting the switch a relatively thick ring 58 of electrical insulating material is secured in the forward end of the cylinder 25 and has a lead spring 59, of electrical conducting material, secured thereto and to a terminal 60 as shown in Fig. 4. This leaf spring 59 extends downwardly in the cylinder 25 to a position in front of a contact 61 which is secured to the insulating ring 58 and to a terminal 62 as shown in Fig. 4, said spring 59 being biased so that the lower end thereof is normally spaced from said contact 61 as shown in Fig. 4 but is movable thereagainst to close the circuit to the lamp 48. This spring 59 is apertured as at 63 to clear the plunger stem 26 sufficiently to preclude any contact therewith.

For operating this switch, 59, 61, a thick cushion ring 65 of insulating material is secured on the hub portion 66 of the plunger plate 33 so as to engage the leaf spring 59 and force the lower end of the latter against the contact 61 when the plunger 32, 33, 34 is pulled forward and this ring 65, at the same time, serves as a cushion to arrest the forward movement of the plunger when it is fully advanced.

This unit, above described, comprising the case 20 and contents, is preferably mounted on or attached to the instrument panel of the automobile in a position in which the plunger knob 27 is conveniently accessible and in which the signal strips 45 and 46 are readily visible to the operator when seated in the driver's seat in the car. For attachment to the instrument panel a U-shaped clamp plate 68 may be connected by cap screws 69 to the side flanges 21 and cover plate 23 to clamp over the under flange 70 of the instrument panel as indicated in Fig. 1.

For controlling the suction in the bellows 35 and the operation of the rocking frame 39 thereby, an opening 71 is provided in the bottom wall of the cylinder 25 near the bellows 35 with a tube 72 leading therefrom and preferably in the form of an elbow braced by a bracket 73 secured to the bottom wall of the case 20. This tube 72 is connected, preferably by a flexible tube 74 (see Figs. 7 and 8), with another tube 75 which projects down through the wall of the automobile motor crankcase so that the lower open end of said tube 75 terminates at a selected distance below the normal full level of oil in the crankcase, the selected level at which the lower end of the tube 75 terminates being such that when the oil is at that low level it is advisable to supply the crankcase with additional oil.

Preferably this tube 75 is arranged for mounting in the crankcase hole which is provided for the customary measuring stick, this hold being indicated at 77 in the fragmentary part 78 of the crankcase top wall.

To this end the tube 75 is secured at its upper end to a plate 79 which serves as a stop to engage the crankcase wall 78 and hold the tube at the proper elevation in the opening 77, and a cylindrical shell 80, split at 81, is provided directly below the plate 79 and encircling the tube 75 to frictionally engage in the opening 77 and hold the tube 75 securely in place in the opening 77.

Preferably the plate 79 is of angular form as shown in Fig. 6 with an upright flange 82, and the upper end of the tube 75 is bent into elbow form as at 83 and projects through an opening in the flange 82 which has an outturned rim 84 in which the elbow portion 83 is firmly secured.

For securing the split cylinder 80 to the plate 79 the latter has a cutout through which a semi-circular portion of the cylinder 80 extends and this semi-circular portion has a radial flange 85 which overlies and is secured to the plate 79.

Preferably the tube 75 and the fitting at the upper end by which it is mounted in the opening 77, is arranged to accommodate a measuring stick in the opening 77 and to this end the tube 75 is flattened, at the side opposite the lateral extending portion of the elbow 83, to substantially semi-circular form and a flat measuring stick 86 is provided which is insertible down through the split side of the cylinder 80 and fits flatwise against the flat side of the tube 75, this stick 86 being of suitable length and suitably graduated to correspond to the usual measuring stick for showing the level of the oil in the crankcase.

This measuring stick 86 may be formed with a loop 87 at the upper end for convenient handling and preferably has a bulge 88 which, when the stick is inserted, engages the lower edge of the cylindrical shell 80 in a manner to retain the stick in place.

The cutout in the plate 79 through which the tube 75 extends may be circular, but it is preferred to construct it with an open side as indicated at 89 to facilitate assembly of the tube 75 and shell 80 on the angular plate 79.

In the operation of the above described device, it is to be understood that the tube 75 projects below the normal level of the oil in the crankcase and terminates at a selected low level at which it is desirable to replenish or add oil in the crankcase.

When the oil in the crankcase is at the normal level or at any level above said selected low level, and the plunger 32, 33, 34 is pulled outwardly, then the lower end of the tube 75 is closed by the oil and the plunger operation creates suction which collapses the bellows 35 thereby pulling the end plate 38 forwardly and rocking the frame 39 and arms 43, thereby lifting the green strip 45 upwardly to a position directly behind the window opening 47.

Moreover, as the plunger 32, 33, 34 is thus pulled forwardly, the cushion ring 65 on the front of the plunger engages the contact spring 59 and clamps the lower end thereof against the contact 61 thereby closing the circuit to the lamp 48 and lighting same thereby illuminating the translucent green strip 45 so that it is conspicuously visible through the window opening 47 and this green signal signifies that the oil in the crankcase is above the level of the lower end of the tube 75 and that there is sufficient oil in the crankcase.

If, however, the oil level is below the lower end of the tube 75, air is free to enter the lower end of the tube 75 and to flow upwardly through said tube and the flexible tube 74 to the cylinder 25 and thus relieve any suction which the forward movement of the plunger 32, 33, 34 would otherwise create in the bellows 35, and accordingly no collapse of the bellows occurs.

Thus, no rocking of the frame 39 and arms 43 occurs and the red strip 46 remains directly behind the window opening 47, and when the lamp 48 is lighted by the forward movement of the plunger the red strip is conspicuously visible through the window opening 47 and signifies that the oil in the crankcase is below the lower end of the tube 75 and that additional oil is needed.

Thus, it may be ascertained at any time, by merely pulling the knob 27 forwardly, whether there is sufficient oil in the crankcase or whether additional oil is needed. Unless the lamp 48 is lighted when the red strip 46 is behind the window opening 47 said strip is concealed behind the white translucent panel 51 and only the white of the latter panel is visible through the window opening and consequently in the normal position of the device the unilluminated white panel signifies that the tester is inactive.

The cylinder 25 is preferably provided with a vent opening 90 at its forward end through which air is exhausted from in front of the plunger 32, 33, 34 as the latter is pulled forward and the opening 71 through which the tube 74 communicates with the interior of the cylinder 25 is preferably arranged as shown in Fig. 4 so that a portion of said opening 71 is exposed in front of the plunger when the latter is fully retracted.

Thus, except when the plunger 32, 33, 34 is pulled forwardly, there is free air communication through the vent opening 90 and cylinder to the opening 71 and therefrom to the tubes 74 and 75 to permit drainage of any oil in the tube 75 down to the level of the oil in the crankcase.

Initial forward movement of the plunger 32, 33, 34 closes communication of the opening 71 with the vent opening 90 and establishes communication of the tubes 74 and 75 with the interior of the bellows 35 for the above described control of the bellows by the level of the oil in the crankcase.

Instead of employing the sight window 47 and the colored strips 45 and 46 with the rocking frame 39, 43 to signify the oil level, two differently colored electric lamps may be employed, for example, a red lamp 91 and a green lamp 92, as shown in Figs. 11, which are conveniently arranged to be clearly visible to the automobile operator and these may be selectively lighted to signify the oil level in the crankcase.

In this event, the entire rocking frame structure 39, 43 is omitted as well as the hook connection 42 therewith and a switch mechanism, such as shown in Figs. 9 and 10 and illustrated diagrammatically in Fig. 11, is provided which cooperates with the previously described switch mechanism 59, 61 to control the operation of the lamps 91 and 92.

This Figs. 9 and 10 switch mechanism comprises a swinging arm 93 which extends diametrically across the rear of the bellows end plate and is secured at its upper end, through an insulator 94 to a bracket 95 fixed on the top of the cylinder 25. This arm 93 is fastened between its ends to the bellows rear end plate 38 as indicated at 96 to move therewith and at its lower end has a pair of connected contacts 97 and 98 at opposite sides engageable respectively with contacts 99 and 100, both of which are secured in an insulated manner on a bracket 101 which is fixed to the bottom of the cylinder 25.

In the normal position of the bellows, shown in Fig. 4, the swinging arm contact 97 engages the fixed contact 99, but when the plunger 32, 33, 34 is pulled forwardly and the oil level in the crankcase is above the lower end of the tube 75 so that the forward movement of the plunger creates suction and collapses the bellows 35, then the arm 93 is moved forwardly with the bellows end plate 38 and causes the contacts 97, 99 to disengage and engages the contact 98 with the contact 100.

The circuit through the switch 59, 61 leads to the swinging arm 93 and, consequently, in the normal position of the device, neither lamp 91 nor 92 is lighted, even though the contact 97 of the arm 93 is engaged with the contact 99 at the time.

When, however, the plunger 32, 33, 34 is pulled forwardly and the switch 59, 61 closed thereby, either one or the other of the lamps 91 or 92 will be lighted, depending upon whether the lower end of the tube 75 is above or below the level of the oil in the crankcase.

If the oil is above the level of the lower end of the tube 75, then, as previously explained, the tube 75 is closed by the oil to access of air and forward movement of the plunger 32, 33, 34 creates suction in the bellows 35 and collapses said bellows sufficiently to swing the arm 93 forwardly to disengage the contact 100, and when the switch 59, 61 is closed by this same forward movement of the plunger, the circuit is closed to the green lamp 92 and the latter lighted to signify that there is sufficient oil in the crankcase.

When, however, the oil is below the lower end of the tube 75, and the plunger 32, 33, 34 is moved forwardly, air enters the tube 75 and by the connection with the cylinder 25 prevents creation of suction in the bellows 35 and the contact 97 remains engaged with the contact 99. Then upon completion of the forward movement of the plunger and closing thereby of the switch 59, 61 the circuit is closed to the red lamp 91, the lighting of which signifies that the oil in the crankcase is at a sufficiently low level to require additional oil.

Referring now to Figs. 12 through 16, which are illustrative of a signal and a suction device, of the present invention, constructed as separate units for mounting at separated places on the automobile instrument panel, the suction unit, which is shown in Fig. 13, comprises a cylinder 102 having a rear end wall 103, integral therewith and provided with a pair of nipples 104 and 105 for attachment of tubes which communicate through the nipples with the interior of the cylinder.

At the front end of the cylinder 102 a closing plate 106 is secured thereto and provided with a central guide 107 for a plunger rod 108 which has a flexible cup member 109 secured thereon between clamping plates 110 and 111 to provide a pump plunger.

The guide 107 has a threaded extension 112 projecting from the front end of the cylinder 102 through an opening in the automobile instrument panel 113 and an internally threaded cap 114 is secured on this extension 112 for securing the cylinder on the panel 113.

An operating knob 115 is secured on the outer end of the plunger rod 108 for operating the pump plunger 109, 110, 111 which is normally located at the rear of the cylinder 102 in the position shown in Fig. 13, and, at this normal pump plunger location, the wall of the cylinder 102 is formed with an offset 116 providing a by-pass 117 which, in the normal retracted position of the plunger, provides communication between the cylinder space at the rear of the plunger, and the cylinder space at the front thereof, which latter space has a vent opening 118 therefrom through the cylinder front wall 106.

The signal unit, which is shown in Figs. 14, 15 and 16, comprises a housing, indicated as a whole at 119, and composed of an inverted U-shaped shell with top wall 120 and two side walls 121 and 122, which said U-shaped shell is secured on a bottom plate 123 which is formed with an upright wall 124 which extends upwardly at the front of the U-shaped shell and is connected to the top wall 120 of the U-shaped shell by an ear 125 bent rearwardly from the top of the upright wall 124.

A mounting block 125 is secured to the side wall 121 of the housing 119, as shown in Fig. 15, and has one end of a bellows 126 secured thereto, and this block has a part 127 leading from the interior of the bellows and communicating with a passageway 128 which has a nipple 129 leading therefrom through the open rear of the housing 119.

The bellows 126 may be secured to the mounting block 125 in any convenient leak proof manner, as for example, the mounting block may have two plates 131 and 132 secured thereon, the latter of which is formed with an annular corrugation 133 offset from the plate 131 to provide an annular recess therebetween, and the bellows 126 may have an annular corrugation at the end stretched over the annular corrugation 133 of the plate 132, and a bead 134, around that end, seated in the annular recess between the plates 131 and 132 as shown in Fig. 15.

The other end of the bellows 126 is similarly secured to plates 135 and 136 which are fastened together and carried by a hanger 137, and this hanger is pivotally mounted at its upper end, as at 138, between ears 139, struck up from the top wall 120 of the housing 119, so that the bellows 126 is expansible and contractible axially and swings the hanger 137 and attached plates 135, 136 on the pivot 138 in its axial expansion and contraction.

The lower end of the hanger is upturned, as at 140, to provide a seat for the crank portion 141 of a stem 142 which is pivoted at its ends in bearing blocks 143 and 144 which are secured respectively to the upright front wall 124 of the housing 119 and to an inturned extension 145 from the rear end of the housing side wall 122, and this stem 142 has an indicator hand or pointer 146 secured thereon which is offset at 147 to extend loosely through a slot or opening 148 in the front wall 124 of the housing 119.

In the illustrated structure, this signal unit is mounted directly behind the glass panel 149 of a window opening 150 through the automobile instrument panel, which is indicated as a whole at 151 in Fig. 12, so that the indicator hand 146 is visible through the window panel 149 and preferably the front wall 124 of the housing 119 has a facing panel 152 secured thereon and extending across the window opening 150 behind the visible portion of the indicator hand 146, this facing panel having the exposed face thereof white or of some color contrasting to that of the hand 146 so that the position of the latter may be readily observed.

The bellows 126 is of such construction that it tends to normally assume the expanded or extended position shown in Fig. 15 and the indicator hand 146 is secured on the stem 142 so that in this normal expanded or extended position of the bellows 126 said hand 146 is disposed at substantially a 45 degree angle to the vertical, as shown in Fig. 12.

Contraction of the bellows 126, however, and the swinging of the hanger 137 therewith, rocks the stem 142 and swings the indicator hand 146 to an upright or vertical position, and the facing panel 152, behind the visible portion of the indicator hand, preferably has the notation "Oil" appearing thereon, as shown in Fig. 12, at the place where the upper end of the indicator hand 146 is located when said hand is in the upright or vertical position.

Preferably the slot 148, of the housing wall 124, through which the offset portion 147 of the indicator hand extends is of such length that said offset portion 147 engages one end of said slot in the 45 degree angular position of the indicator hand 146 and engages the other end of said slot in the upright or vertical position of the indicator hand, and the ends of the slot 148 thus serve as stops to limit the movement of the indicator hand and to determine the two extreme positions of operation thereof.

This signal unit may be mounted on the instrument panel 151 in any convenient manner and may be provided for this purpose with a bracket 153, the downturned end of which is adapted to engage against the rear of the instrument panel and be secured thereto.

The suction pump of Fig. 13 and signal unit of Figs. 14, 15 and 16 are controlled by the level of the oil in the motor crankcase in the same manner as the suction device and signal of Figs. 1, 2, 3 and 4, previously described and are connected to a crankcase unit such as shown in Figs. 6, 7 and 8 and also previously described.

Accordingly, either one of the nipples 104 or 105 of Fig. 13, for example, the nipple 105 is connected by a flexible tube 74A with the elbow 83 (Figs. 6 and 7) and the other nipple 104 is connected by a flexible tube 154 with the nipple 129 of the signal unit of Figs. 12, 14, 15 and 16 so that the air pressure in the rear chamber of the pump cylinder 102 of Fig. 13 is communicated to the interior of the bellows 126.

Thus, when the plunger 109, 110, 111 is in the normal retracted position shown in Fig. 13, air is free to enter through the vent opening 118 and by-pass 117 to the chamber at the rear of the plunger and as this chamber is connected by the tube 154 with the bellows 126 of the signal unit, the latter bellows is free to maintain the normal expanded position, shown in Fig. 15, and the indicator hand 146 occupies the 45 degree angular position shown in Fig. 12.

When it is desired to ascertain whether or not there is sufficient oil in the motor crankcase, the knob 115 is pulled outwardly to the extreme forward position, and in the initial movement thereof the plunger 109, 110, 111 moves beyond the by-pass 117 and thereby closes communication of the rear chamber of the cylinder 102 with the vent opening 118.

Thereafter, the forward movement of the plunger 109, 110, 111 tends to create suction in the rear chamber of the cylinder 102 and if the oil level in the crankcase is above the lower end of the tube 75 of Fig. 6, suction is created therein and communicated by the tube 154 to the bellows 126 which is contracted thereby and swings the indicator hand 146 to the upright oil indicating position which signifies that there is sufficient oil in the crankcase.

On the other hand, if the oil is below the lower end of the tubes 75 of Fig. 6, and the knob 115 is pulled forward, air will enter through said tube and the flexible tube 74A to the rear chamber of the cylinder 102 and thereby prevent the creating of sufficient suction in said chamber to operate the bellows 126 and the indicator hand 146 will remain in the 45 degree angle position of Fig. 12 which signifies that the oil in the crankcase is sufficiently low to require additional oil.

Obviously, the tube 74A from the crankcase need not be connected directly to the cylinder 102, but it may be connected instead to the signal unit of Figs. 14, 15 and 16 or into the tube 154 which leads from the cylinder 102 to the signal unit, as it is merely necessary for said tube 74A to be connected at a place where it will control the creating of suction or subatmospheric pressure in the bellows 126 by the suction device of Fig. 13.

Moreover, it will be obvious that the device may be arranged to operate by compression instead of suction, and that by employing a plurality of suction device and signal assemblies, each with a separate tube leading therefrom to a different level in the crankcase, the particular level of the oil may be more closely ascertained.

Instead, however, of employing a plurality of suction device and signal assemblies for more closely ascertaining the particular level of the oil, I prefer to employ a single suction device and signal assembly with a plurality of tubes leading thereto from the crankcase through a tube selector such as shown in Figs. 18 and 19.

This tube selector comprises a valve casing 155 having a cylindrical chamber which is closed at one end and contains a hollow rotatable plug type valve 156 which is rotatable by a stem 157 which extends to a point for convenient manipulation by the operator and is provided with a knob, not shown, for convenient turning thereof. This valve 156 is held in the cylindrical chamber of the valve casing 155 by a gland 158 which is threaded into the open end of the cylindrical chamber of the valve casing 155 and the stem 157 projects through this gland, as shown in Fig. 18.

As its inner closed end, the valve casing 155 has three radial ports 159, equally spaced therearound, and each closed at its outer end by a plug 160, which lead from the cylindrical valve chamber of the casing 155 respectively to separate nipples 161 which have separate tubes 162, 163, and 164 leading therefrom, to the crankcase and terminating therein at successively lower levels as indicated in Fig. 17.

The valve 156 has a single opening 165 which leads from the central opening 166 therein, and may be adjusted, by rotation of the valve, to register selectively with each of the three ports 159, and the valve 156 preferably has three ball seats 167 suitably spaced therearound and engageable by a spring pressed ball 168 to facilitate locating and holding the valve 156 in each of the three positions of registration respectively with the three ports 159.

Preferably also, the knob at the outer end of the stem 157 by which the valve 156 is rotated, is also indexed for visible setting at the proper three positions for valve communication respectively with the three ports 159 and their respective tubes 162, 163 and 164.

At a distance forwardly from the opening 165, the valve 156 has a peripheral channel 169 therearound communicating through several openings 170 with the central opening 166 of the valve and this channel 169 also communicates through an opening 171 in the casing wall and a nipple 172, which is secured in said opening 171, with the suction chamber of the suction device of either of the suction devices hereinbefore described.

For example, the elbow 72 of the Fig. 1, 2 and 4 suction device may be omitted and the tube 172 connected to the cylinder 25 in place of said tube 72, so that the tubes 162, 163 and 164 communicate with the interior of the cylinder 25 selectively according to the particular adjustment of the valve 156.

When thus arranged and it is desired to ascertain the level of the oil in the crankcase, the valve is adjusted, for example, so that the tube 162 communicates with the interior of the cylinder 25 and the plunger 32, 33, 34 pulled forwardly and if the green signal strip 45 shows through the window 47 it is indicated thereby that the oil level is above the lower end of the tube 162.

If, however, the red strip 46 shows through the window 47, thereby indicating the oil is below the level of the lower end of the tube 162, the valve 156 is then adjusted to connect the next tube 163 with the cylinder 25 and the plunger 32, 33, 34 is operated again, and if the green strip 45 then shows through the window 47 it indicates that the oil level is somewhere between the lower end of the tube 162 and the lower end of the tube 163.

If, however, the red strip 46 shows through the window 47 in this second operation of the plunger 32, 33, 34, thereby indicating that the oil level is below the lower end of the tube 163, then the valve 156 is adjusted to connect the tube 164 with the cylinder 25 and the plunger 32, 33, 34 operated again. If the green strip 45 then shows through the window 47 it indicates that the oil level is somewhere between the lower end of the tube 163 and the tube 164, whereas if the red strip 46 shows, it indicates that the oil level is below the lower end of the tube 164.

Thus, with the three tubes and valve connecting of Figs. 17, 18 and 19 the particular level of the oil in the crankcase may be ascertained quite closely.

Referring now to the modified form shown in Fig. 20, there is shown an internal combustion engine 200 provided with an intake manifold 201 and a crankcase 202 having oil 203 therein, with the crankcase being provided with the usual dip stick opening 204 into which a tube 205 forming a part of the present indicating system may be inserted. The lower end 206 of the tube is positioned at the liquid level which is desired to be measured. Thus in an internal combustion engine may be positioned at the "add oil" level. The tube 205 is connected to a passage 207 in turn connected to a vacuum device 208. For creating a vacuum in the passage 207, and hence in the tube 205, the vacuum device 208 may be connected through a suitable manually operable control valve 209 to a conduit 210 connected to the intake manifold 201. Also connected to the passage 207 is another conduit 211 in turn connected to a vacuum responsive indicating device 212 which may take the form of the device previously described.

Figure 21:
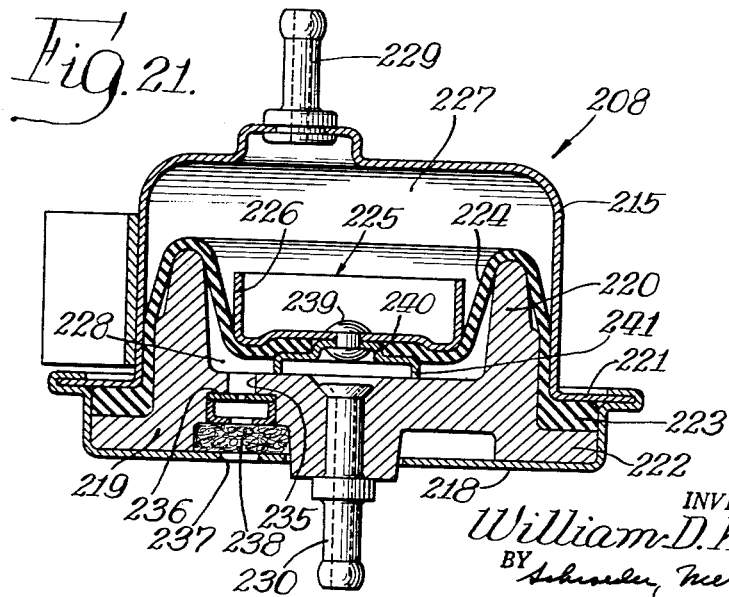
Fig. 21 is a sectional view through a modified form of vacuum applying device.

Referring to Fig. 21, the device 208 includes a cover plate 215 secured to a bottom plate 218 the side edges of which are bent over the edge of the cover plate as shown. Located within the member 208 is a member 219 shaped to conform generally with the bottom plate and provided with an annular upstanding wall 220 spaced from the interior side walls of the cover plate. Secured between a flange portion 221 on the cover plate and an annular integral ring 222 formed on the member 219 is one edge 223 of a diaphragm 224. The diaphragm is movable within the member 208 from the position shown in Fig. 21 to a position in which the center portion 225 of the diaphragm is moved upwardly so as to bring an annular upstanding wall 226 of a weighting member carried thereby against the interior surface of the upper portion of the cover. The diaphragm 224 divides the interior of the member 208 into a vacuum chamber 227 above the diaphragm and a gauge chamber 228 below the diaphragm. The vacuum chamber 227 is connected by means of a conduit 229 to the valve member 209 while the gauge chamber 228 is connected by means of a nipple 230 to the conduit 207.

In operating the device shown in Figs. 20 and 21, the valve member 209 may be provided with a manually actuable control knob 231 to establish communication between the passage 229 and conduit 210 and thus to apply the vacuum existing in the intake manifold 201 to the vacuum chamber 227. Evacuation of the chamber 227 so caused will move the diaphragm 224 upwardly, thus to evacuate the gauge chamber 228. If the level of the oil 203 in the crankcase is above the lower end 206 of the tube, such upward movement of the diaphragm 224 produces a vacuum in the gauge chamber and of course in the conduit 207. Inasmuch as the conduit 211 is connected to the conduit 207, such vacuum is applied to the indicating device 212 to cause the indicating needle thereof to move to indicate a safe level of oil. Should the level of liquid be below the end of the tube, the movement of the diaphragm 224 upward evacuating the chamber 228 produces no vacuum in the conduit 207 or in the gauge chamber inasmuch as the expanding chamber 228 is filled with gases from the interior of the crankcase.

After completing the operation the knob 231 may be returned to its normal position wherein the valve 209 blocks communication between the conduits 210 and 229 and connects conduit 229 to atmosphere, thus no longer applying vacuum to the vacuum chamber 227. To allow the diaphragm 224 to return to its normal position shown in Fig. 21 under the bias of its centrally carried weight, there is provided a bleeder passage 235 extending through the member 219, with the bleeder passage being reduced to a relatively small orifice by an intervening diaphragm member 236 and the outlet to atmosphere is through an opening 237 in the bottom plate 218. To provide for only a slow flow of air through the bleeder passages just mentioned, a filter pad 238 covers the opening 237 and serves not only to permit but a slow flow through the bleeder passages in the gauge chamber 228 until after the indication has been observed, but also to prevent dirt particles from being drawn into the gauge chamber when the diaphragm is moved upwardly.

A rivet 239 holds the central weight to the diaphragm and also holds a spacing member 240 to the lower portion of the diaphragm, with the spacing member being provided with a downwardly extending annular wall 241 serving to space the diaphragm above the inner opening of the nipple 230. Thus the diaphragm is not permitted to block the inner end of the nipple.

If desired, the valve member 209 may be eliminated and the passage 210 connected directly to the passage 229. With this latter form of installation an indication is attained when the engine is first started and vacuum is first applied to the chamber 227. After the engine has been running for some time, the vacuum in the gauge chamber 228 is dissipated through the bleed orifice and thus the gauge becomes ineffective until the engine is restarted after a subsequent halt.

I claim:

1. A device for determining the level of liquid in a container comprising a channel opening at one end to the interior of the container, a vacuum sensitive signaling device connected to the channel and responsive to a vacuum therein to provide a signal, a cylinder, a wall in the cylinder movable through a predetermined distance to evacuate a predetermined amount of air from the cylinder to produce a vacuum therein, and means operated by the vacuum produced in the cylinder to evacuate air from the channel to produce a vacuum therein when the liquid covers the opening of the channel.

2. A device for determining oil level in the crankcase of an internal combustion engine comprising a tube positionable in the dip-stick opening of the crankcase to have its lower end opening into the interior of the crankcase, a gauge chamber, first passage means connecting the gauge chamber with the tube, a vacuum sensitive signaling device, said signaling device being responsive to a vacuum in the first passage means to provide a signal, a second chamber, a movable element forming a common closure wall for each of the chambers, and means in the second chamber to cause movement of the element to expand the gauge chamber and to produce a vacuum in the passage means when the oil in the crankcase covers the lower end of the tube.

3. A device for determining oil level in the crankcase of an internal combustion engine comprising a tube positionable in the dip-stick opening of the crankcase to have its lower end opening into the interior of the crankcase, means forming a closed housing, a flexible diaphragm having its edges secured to the housing and dividing the housing into a gauge chamber on one side of the diaphragm and a vacuum chamber on the other side of the diaphragm, a first passage means connecting the gauge chamber with the tube, a vacuum sensitive signaling device, a second passage means connecting the signaling device to the gauge chamber, said signaling device being responsive to a vacuum in the gauge chamber to provide a signal, and means for evacuating the vacuum chamber to move the diaphragm whereby to expand the gauge chamber and produce a vacuum therein when the oil in the crankcase covers the lower end of the tube.

4. A device for determining oil level in the crankcase of an internal combustion engine comprising a tube positionable in the dip-stick opening of the crankcase to have its lower end opening into the interior of the crankcase, means forming a closed housing, a flexible diaphragm having its edges secured to the housing and dividing the housing into a gauge chamber on one side of the diaphragm and a vacuum chamber on the other side of the diaphragm, a first passage means connecting the gauge chamber with the tube, a vacuum sensitive signaling device, a second passage means connecting the signaling device to the gauge chamber, said signaling device being responsive to a vacuum in the gauge chamber to provide a signal, a bleed passage opening into the gauge chamber to provide a restricted opening to atmospheric pressure, and means for evacuating the vacuum chamber to move the diaphragm whereby to expand the gauge chamber and produce a vacuum therein when the oil in the crankcase covers the lower end of the tube.

5. A device for determining oil level in the crankcase of an internal combustion engine comprising a tube positionable in the dip-stick opening of the crankcase to have its lower end opening into the interior of the crankcase, means forming a closed housing, a flexible diaphragm having its edges secured to the housing and dividing the housing into a gauge chamber on one side of the diaphragm and a vacuum chamber on the other side of the diaphragm, a first passage means connecting the gauge chamber with the tube, a vacuum sensitive signaling device, a second passage means connecting the signaling device to the gauge chamber, said signaling device being responsive to a vacuum in the gauge chamber to provide a signal, a bleed passage opening into the gauge chamber to provide a restricted opening to atmospheric pressure, and third passage means connecting the vacuum chamber to the intake manifold of the engine for evacuating the vacuum chamber to move the diaphragm whereby to expand the gauge chamber and produce a vacuum therein when the oil in the crankcase covers the lower end of the tube.

6. A device for determining oil level in the crankcase of an internal combustion engine comprising a tube positionable in the dip-stick opening of the crankcase to have its lower end opening into the interior of the crankcase, means forming a closed housing, a flexible diaphragm having its edges secured to the housing and dividing the housing into a gauge chamber on one side of the diaphragm and a vacuum chamber on the other side of the diaphragm, a first passage means connecting the gauge chamber with the tube, a vacuum sensitive signaling device, a second passage means connecting the signaling device to the gauge chamber, said signaling device being responsive to a vacuum in the gauge chamber to provide a signal, a bleed passage opening into the gauge chamber to provide a restricted opening to atmospheric pressure, third passage means connecting the vacuum chamber to the intake manifold of the engine for evacuating the vacuum chamber to move the diaphragm whereby to expand the gauge chamber and produce a vacuum therein when the oil in the crankcase covers the lower end of the tube, and manually operable valve means controlling said third passage means.

7. A device for determining oil level in the crankcase of an internal combustion engine comprising a tube positionable in the dip-stick opening of the crankcase to have its lower end opening into the interior of the crankcase, means forming a closed housing, a horizontally arranged flexible diaphragm having its edges secured to the housing and dividing the housing into a gauge chamber below the diaphragm and a vacuum chamber above the diaphragm, means constantly biasing the diaphragm downwardly, first passage means connecting the gauge chamber with the tube, a vacuum sensitive signaling device, a second passage means connecting the signaling device to the gauge chamber, said signaling device being respective to a vacuum in the gauge chamber to provide a signal, a bleed passage opening into the gauge chamber to provide a restricted opening to atmospheric pressure, third passage means connecting the vacuum chamber to the intake manifold of the engine for evacuating the vacuum chamber to move the diaphragm whereby to expand the gauge chamber and produce a vacuum therein when the oil in the crankcase covers the lower end of the tube, and manually operable valve means controlling said third passage means.

8. A device for determining oil level in the crankcase of an internal combustion engine comprising a tube positionable in the dip-stick opening of the crankcase to have its lower end opening into the interior of the crankcase, means forming a closed housing, a horizontally arranged flexible diaphragm having its edges secured to the housing and dividing the housing into a gauge chamber below the diaphragm and a vacuum chamber above the diaphragm, a weight carried by the diaphragm for constantly biasing the diaphragm downwardly, first passage means connecting the gauge chamber with the tube, a vacuum sensitive signaling device, a second passage means connecting the signaling device to the gauge chamber, said signaling device being responsive to a vacuum in the gauge chamber to provide a signal, a bleed passage opening into the gauge chamber to provide a restricted opening to atmospheric pressure, third passage means connecting the vacuum chamber to the intake manifold of the engine for evacuating the vacuum chamber to move the diaphragm whereby to expand the gauge chamber and produce a vacuum therein when the oil in the crankcase covers the lower end of the tube, and manually operable valve means controlling said third passage means.

9. A device for determining the level of liquid in a container comprising a channel opening at one end to the interior of the container, a vacuum sensitive device connected to the channel, an electrical signaling device connected to be operated by said vacuum sensitive device in response to a vacuum in the channel to provide a visual signal, and means for evacuating the channel to draw liquid into the channel when the liquid covers the opening of the channel to produce a vacuum in the channel equal to the weight of liquid drawn into the channel.

References Cited in the file of this patent

UNITED STATES PATENTS

| | | |
|---|---|---|
| 1,566,338 | Mayhew | Dec. 22, 1925 |
| 1,677,494 | Rockwell | July 17, 1928 |
| 2,141,325 | Werder | Dec. 27, 1938 |
| 2,334,220 | Samiran | Nov. 16, 1943 |
| 2,588,761 | Raby | Mar. 11, 1952 |
| 2,626,386 | Raby | Jan. 20, 1953 |

FOREIGN PATENTS

| | | |
|---|---|---|
| 662,939 | France | Mar. 29, 1929 |
| 804,280 | France | July 27, 1936 |